United States Patent [19]
Shibuya

[11] Patent Number: 5,113,748
[45] Date of Patent: May 19, 1992

[54] DEFROSTER CONSTRUCTION FOR AUTOMOTIVE AIR CONDITIONER

[75] Inventor: Naoharu Shibuya, Tokyo, Japan

[73] Assignee: Nissan Motor Co., Ltd., Yokohama, Japan

[21] Appl. No.: 742,032

[22] Filed: Aug. 8, 1991

[30] Foreign Application Priority Data

Aug. 9, 1990 [JP] Japan .................................. 2-210714

[51] Int. Cl.⁵ .............................................. B60S 1/54
[52] U.S. Cl. .................................... 454/127; 454/121
[58] Field of Search ...................... 98/2.04, 2.08, 2.09

[56] References Cited

U.S. PATENT DOCUMENTS 2,096,901 10/1937 Knecht .................................. 98/2.09
4,615,262 10/1986 Taniguchi ............................ 98/2.08

FOREIGN PATENT DOCUMENTS 6112 1/1984 Japan .................................... 98/2.09

Primary Examiner—Harold Joyce
Attorney, Agent, or Firm—Foley & Lardner

[57] ABSTRACT

A defroster construction comprises a defroster nozzle main body having a connecting end for connection with a defroster side outlet of an air conditioning unit and elongated in a vehicle width direction. The defroster nozzle main body has substantially at a longitudinal center of the connecting end a first air inlet for supplying conditioned air to side ducts. The defroster nozzle main body further has at the connecting end a pair of second air inlets for supplying conditioned air to a pair of front defroster nozzles, independently. The second air inlets are located on opposite sides of the first inlet which are opposed in the longitudinal direction of the connecting end. An air flow guide is provided to the first air inlet so as to equally distribute a quantity of conditioned air to the respective side ducts.

8 Claims, 4 Drawing Sheets

DEFROSTER CONSTRUCTION FOR AUTOMOTIVE AIR CONDITIONER

BACKGROUND OF THE INVENTION

1. Field of the Invention

The present invention relates to a defroster construction for an automotive air conditioner.

2. Description of the Prior Art

A prior art defroster construction is shown in FIGS. 5 and 6. In the figures, 1 is a heater unit having inside thereof a heater core 2. 4 is a defroster nozzle main body having an opened connecting end 5 connected to a defroster side outlet 3 of the heater unit 1. The defroster nozzle main body 4 has bifurcated left and right front defroster nozzles 6 and 6 from which conditioned air is blown against a windshield 13. Between the front defroster nozzles 6 and 6 the defroster nozzle main body 4 is provided with a recessed portion 7 so as not to interfere with a bracket 15 for installation of an instrument panel 14. On the rear side or inboard side of the defroster nozzle main body 4 there are provided side ducts 8 and 8 which are integral with the defroster nozzle main body 4. The side ducts 8 and 8 are communicated with left and right side defroster nozzles 9, respectively. An air inlet 11 for the side ducts 8 and 8 is arranged centrally between the front defroster nozzles 6 and 6 and at the rear of an air inlet 10 for the front defroster nozzles 6 and 6 while being separately defined from the air inlet 10 such that a quantity of conditioned air supplied thereto from the defroster side outlet 3 of the heater unit 1 is distributed to the front defroster nozzles 6 and 6 and to the side ducts 8 and 8 under control of a defroster door 12.

Further, as shown in FIG. 7, it is known such a defroster construction in which air inlets 11 and 11 for the side ducts 8 and 8 are separately provided on the opposite sides of the air inlet 10 for the front defroster nozzles 6 and 6 so as to reduce the front to rear size of the defroster nozzle main body 4. A similar defroster construction is disclosed in Japanese Utility Model Provisional Publication No. 62-145766.

In the case of the construction of FIGS. 5 and 6, the defroster door 12 is adapted to define adjacent a rear part of the connecting end 5 a passage for allowing conditioned air from the heater unit 1 to flow into the defroster nozzle main body 4. Due to this, the ratio of a quantity of conditioned air to be supplied to the inlet 10 to a quantity of conditioned air to be supplied to the inlet 11 varies depending upon variation of opening of the defroster door 12, i.e., the ratio attained when the defroster door 12 is fully opened differs from that attained when partly opened. Particularly, when the defroster door 12 is partly opened, the quantity of conditioned air distributed to the air inlet 10 for the front defroster nozzles 6 and 6 is reduced relative to the quantity of conditioned air supplied to the air inlet 11 for the side ducts 8 and 8, thus making it impossible to defrost the windshield 13 desiredly or efficiently.

In the case of the construction of FIG. 7, the air inlets 11 and 11 are provided on the opposite sides of the inlet 10. Due to this, the air inlets 11 and 11 have a positional relationship of being upstream and downstream relative to the air flow "a" in the heater unit 1, thus causing the quantities of conditioned air supplied to the side ducts 8 and 8 to differ from each other and therefore causing the left and right front door window panels to be defrosted differently from each other.

Further, in either of the constructions, the recessed portion 7 provided between the front defroster nozzles 6 and 6 causes the flow of conditioned air supplied thereto through the air inlet 10 to deflect largely and blow out of the front defroster nozzles 6 and 6 as indicated by the arrows "a₁", thus making it impossible to efficiently defrost the central portion of the windshield 13.

SUMMARY OF THE INVENTION

In accordance with the present invention, there is provided a defroster construction for an automotive air conditioning unit having a defroster side outlet. The defroster construction comprises a defroster nozzle main body having a connecting end for connection with the defroster side outlet of the air conditioning unit, a plurality of front defroster nozzles integral with the defroster nozzle main body, and a pair of side ducts integral with the defroster nozzle main body and extending in opposite vehicle width directions. The above structure may substantially follow the conventional fashion.

An aspect of the present invention resides in that the defroster nozzle main body has substantially at a center of the connecting end an air inlet for supplying conditioned air from the air conditioning unit to the side ducts.

A further aspect of the present invention resides in that the connecting end is elongated in a vehicle width direction, that the air inlet is located substantially at a longitudinal center of the connecting end, that the defroster nozzle main body further comprises at the connecting end a pair of second air inlets for supplying conditioned air from the air conditioning unit to the front defroster nozzles, independently, and that the second air inlets is located on longitudinally opposite sides of the first mentioned air inlet.

The above structure is effective for solving the above noted problems inherent in the prior device.

It is accordingly an object of the present invention to provide a novel and improved defroster construction which can maintain substantially unchanged the ratio of a quantity of condition air to be supplied to front defroster nozzles to a quantity of conditioned air to be supplied to side ducts, without being affected by variation of opening of a defroster door.

It is a further object of the present invention to provide a novel and improved defroster construction of the above described character which can defrost a windshield and front door window panels with an improved efficiency.

It is a further object of the present invention to provide a novel and improved defroster construction of the above described character which can defrost a central portion of the windshield with an improved efficiency.

DETAILED DESCRIPTION OF THE PREFERRED EMBODIMENTS

Figure 1:
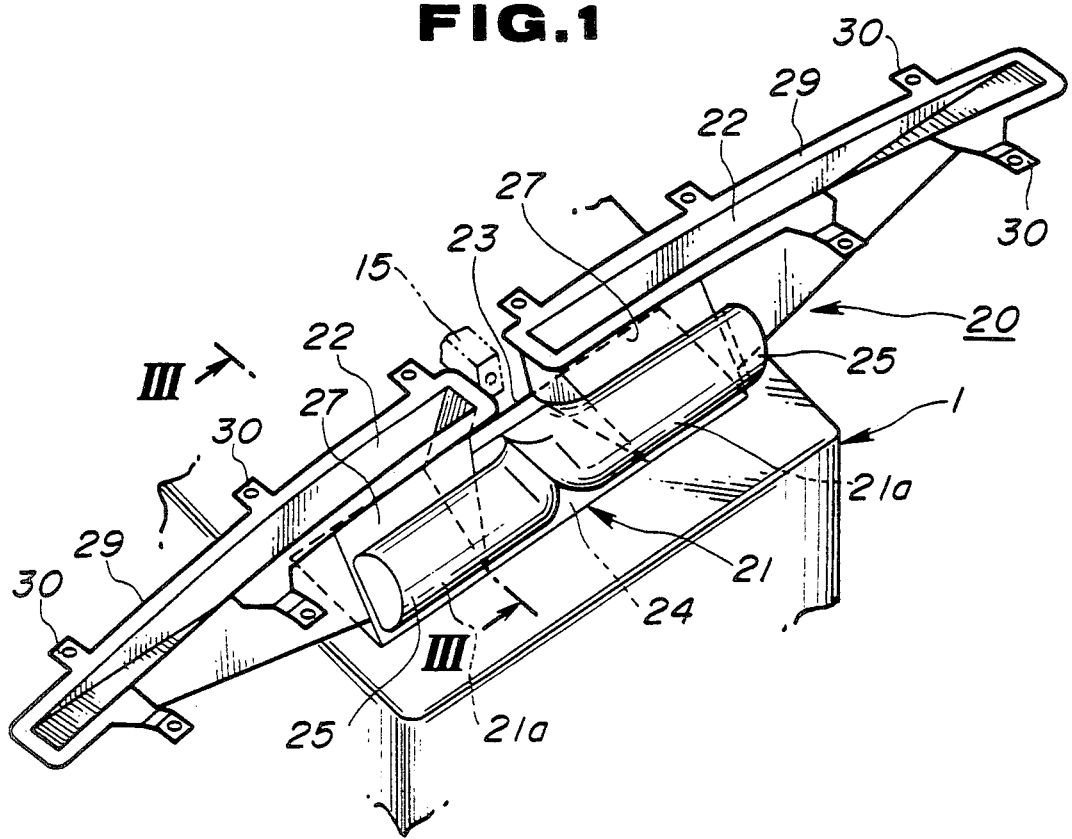
FIG. 1 is an exploded view of a defroster construction according to an embodiment of the present invention.
Figure 2:
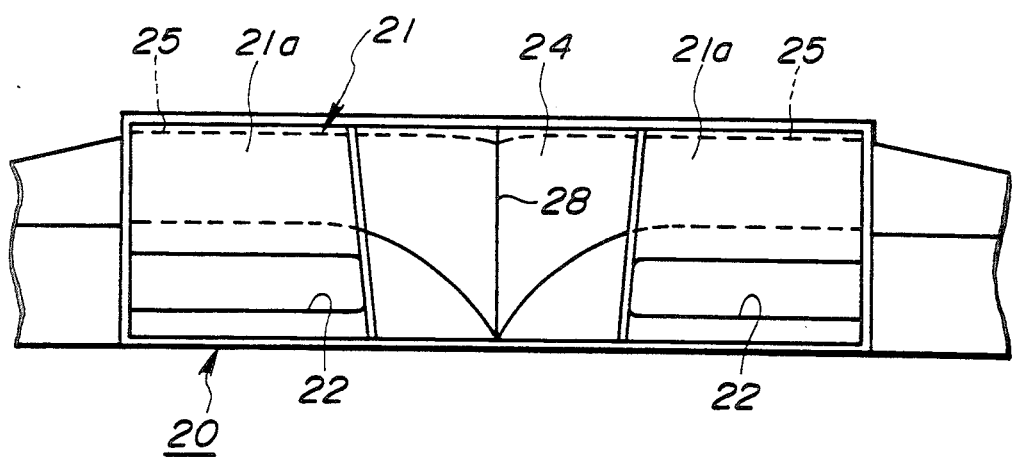
FIG. 2 is a bottom view of the defroster construction of FIG. 1.
Figure 3:
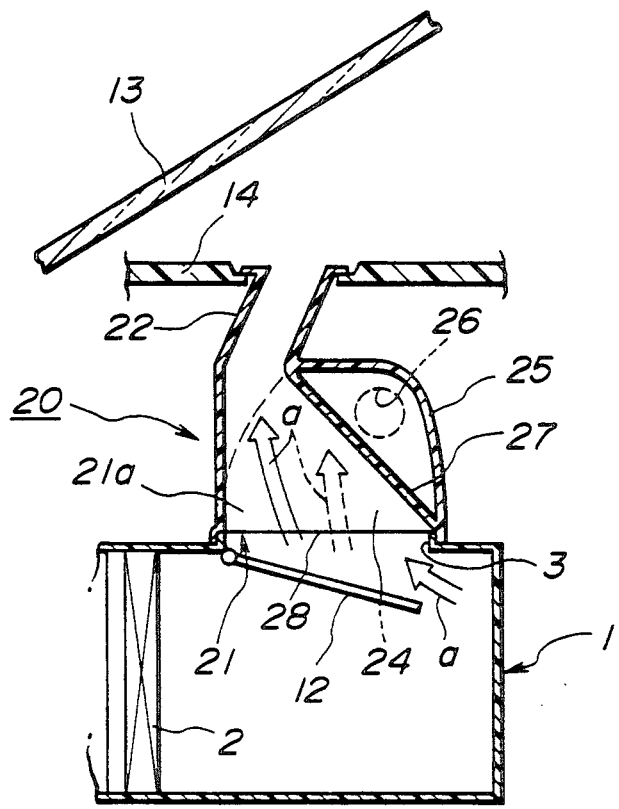
FIG. 3 is a sectional view taken along the line III—III of FIG. 1.
Figure 4:
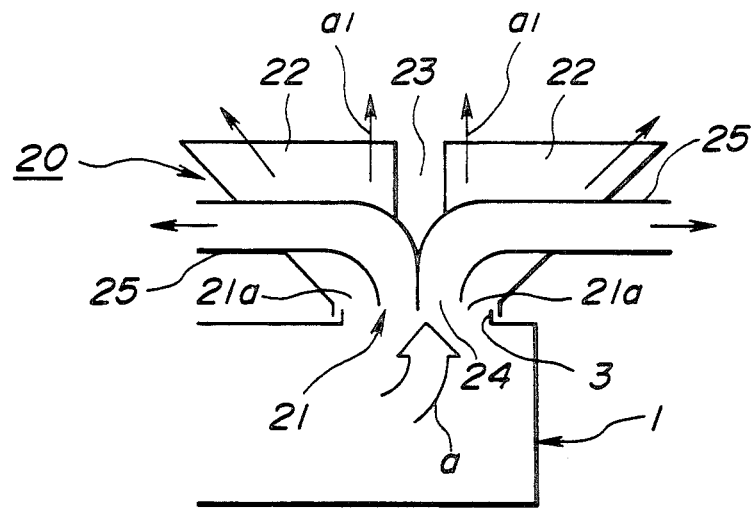
FIG. 4 is a diagrammatic representation of the defroster construction of FIG. 1.
Figure 5:
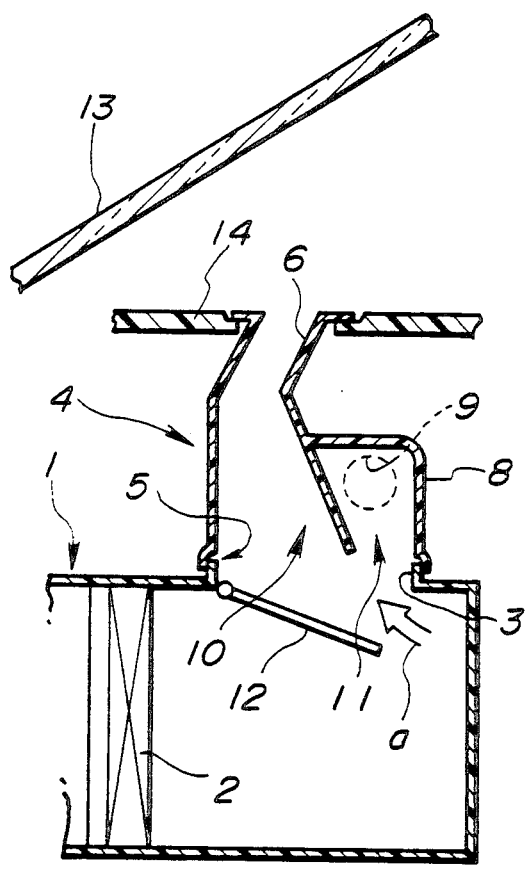
FIG. 5 is a view similar to FIG. 3 but shows a prior art construction.
Figure 6:
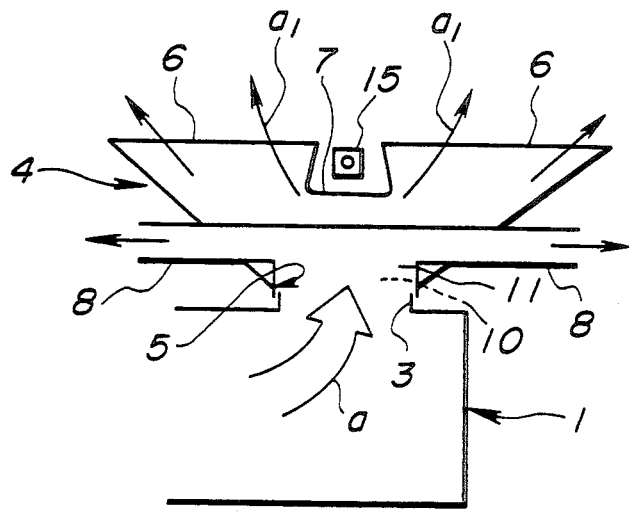
FIG. 6 is a view similar to FIG. 4 but shows the prior art construction of FIG. 5.
Figure 7:
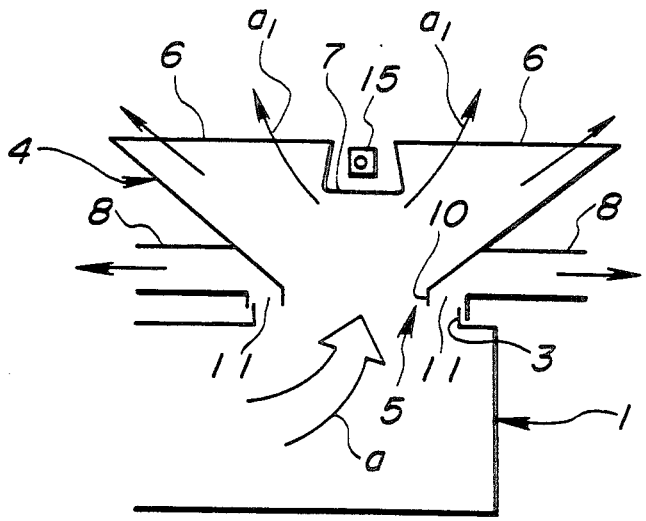
FIG. 7 is a view similar to FIG. 4 but shows another prior art construction.

Referring to FIGS. 1 to 4 in which like or corresponding parts to those of the prior art construction of FIGS. 5 to 7 are designated by the same reference numerals, a defroster nozzle main body is generally indicated by 20 and includes an opened connecting end 21 connected to a defroster side outlet 13 of a heater unit or air conditioning unit 1. The connecting end 21 is elongated laterally of a vehicle body, i.e., in a vehicle width direction. The defroster nozzle main body 20 is integral with bifurcated left and right front defroster nozzles 22 and 22 and has a recessed portion 23 between the front defroster nozzles 22 and 22 so as not to interfere with a bracket 15 for installation of an instrument panel 14 (refer to FIG. 3). The defroster nozzle main body 20 further has substantially at a longitudinal center of the connecting end 21 an air inlet 24 for supplying conditioned air to side ducts 25 and 25. The side ducts 25 and 25 are integral with the defroster main body 20 and extend away from the inlet 24 in opposite vehicle width directions so as to communicate left and right side defroster nozzles 26, respectively. The defroster nozzle main body 20 further has at the inlet end 21 a pair of air inlets 21a and 21a for supplying conditioned air to the front defroster nozzles 22 and 22. The air inlets 21a and 21a are disposed on opposite sides of the air inlet 24 which are opposed in the longitudinal direction of the connecting end 21. In this embodiment, the side ducts 25 and 25 are formed integral with air flow accelerating portions 27 declining rearward and forming part of a rear side wall of the the defroster nozzle main body 20. The side ducts 25 and 25 communicated with the air inlet 24 is disposed under the recessed portion 23. Further, at the longitudinal center of the air inlet 24 there is provided a wedge-shaped air flow guide 28 for smoothly distributing a quantity of conditioned air to the left and right side ducts 25 and 25. In FIG. 1, indicated by 30 are brackets for securing a peripheral flange 29 of the front defroster nozzles 22 and 22 to the instrument panel 14.

With the foregoing construction, conditioned air from the heater unit or air conditioning unit 1 is supplied from the defroster side outlet 3 to the air inlet 24 and to the air inlets 21a and 21a on the opposite sides of the inlet 24 which are opposed in the vehicle width direction or in the longitudinal direction of the connecting end 21. A quantity of conditioned air supplied to the air inlet 24 is substantially equally distributed, by means of the wedge-shaped air guide 28, to the side ducts 25 and 25 to blow out from the side defroster nozzles 26 against unshown front door window panels. On the other hand, a quantity of conditioned air supplied to each air inlets 21a and 21a is not divided or distributed further but blows out from the left and right front defroster nozzles 22 and 22 against the windshield 13.

In the foregoing, it will be understood that since the air inlet 24 for the side ducts 25 and 25 is disposed substantially at the longitudinal center of the connecting end 21, and further since the air inlets 21a and 21a for the front defroster nozzles 22 and 22 are disposed on the sides of the inlet 24 which are opposed in the longitudinal direction of the connecting end 21, there is not substantially any quantity of conditioned air that blows against the recessed portion 23 to deflect largely to the left and to the right as in the case of the prior art construction but each front defroster nozzle 22 can blow air efficiently through its almost entire opening area as shown in the arrows "$a_1$" in FIG. 4, thus making it possible to defrost the central portion of the windshield 13 desiredly or efficiently.

It will be further understood that even when the defroster door 12 is in a partly opened position as shown by the solid line in FIG. 3, a quantity of conditioned air "a" from the heater unit or air conditioning unit 1 can flow uniformly into the inlet 24 and the inlets 21a and 21a, thus making it possible to maintain substantially unchanged the ratio of a quantity of conditioned air to be distributed to the front defroster nozzles 22 and 22 to a quantity of conditioned air to be distributed to the side ducts 25 and 25 and therefore to the side defroster nozzles 26, irrespectively of a variation of opening of the defroster door 12, i.e., irrespectively of whether the defroster door 12 is partly open or fully open, and therefore making it possible to attain a stable defrosting action.

What is claimed is:

1. A defroster construction for an automotive air conditioning unit having a defroster side outlet, comprising:
    a defroster nozzle main body having a connecting end for connection with the defroster side outlet of the air conditioning unit and elongated in a vehicle width direction;
    a plurality of front defroster nozzles integral with said defroster nozzle main body; and
    a pair of side ducts integral with said defroster nozzle main body and extending in opposite vehicle width directions;
    said defroster nozzle main body having substantially at a longitudinal center of said connecting end an air inlet for supplying conditioned air from the air conditioning unit to said side ducts.

2. The defroster construction according to claim 1, wherein said connecting end is elongated in a vehicle width direction, said air inlet being located substantially at a longitudinal center of said connecting end, said defroster nozzle main body further comprising at said connecting end a pair of second air inlets for supplying conditioned air from the air conditioning unit to said front defroster nozzles, independently, said second air inlets being located on opposite sides of said first mentioned air inlet which are opposed in the longitudinal direction of said connecting end.

3. The defroster construction according to claim 2, wherein said defroster nozzle main body has a recessed portion for preventing its interference with an associated vehicle part, said first mentioned air inlet being located under said recessed portion.

4. The defroster construction according to claim 3, further comprising a wedge-shaped air flow guide which is disposed substantially at the longitudinal center of said connecting end so as to equally distribute a quantity of conditioned air supplied thereto to said side ducts.

5. The defroster construction according to claim 4, further comprising a defroster door swingable in a vehicle longitudinal direction.

6. The defroster construction according to claim 5, wherein said defroster door is pivotally installed so as to define adjacent a rear part of said connecting end a passage for providing communication between the defroster side outlet and said connecting end.

7. The defroster construction according to claim 6, wherein said front defroster nozzles comprise two front defroster nozzles between which the recessed portion is located.

8. The defroster construction according to claim 7, further comprising side defroster nozzles connected to said side ducts, respectively.

* * * * *